US012686648B2

(12) United States Patent
Van Belzen et al.

(10) Patent No.: US 12,686,648 B2
(45) **Date of Patent: *Jul. 21, 2026**

(54) METHOD FOR THE MANUFACTURE OF A UREA-BASED COMPOSITION COMPRISING THE ADDITION OF AN ADDITIVE IN AN AQUEOUS FORM

(71) Applicant: Yara International ASA, Oslo (NO)

(72) Inventors: Ruud Van Belzen, Terneuzen (NL); Filip Colpaert, Zwijnaarde (BE); Francois Ledoux, Cormeilles en Parisis (FR)

(73) Assignee: YARA INTERNATIONAL ASA, Oslo (NO)

( * ) Notice: Subject to any disclaimer, the term of this patent is extended or adjusted under 35 U.S.C. 154(b) by 535 days.

This patent is subject to a terminal disclaimer.

(21) Appl. No.: 18/268,109

(22) PCT Filed: Dec. 21, 2021

(86) PCT No.: PCT/EP2021/086967

§ 371 (c)(1),
(2) Date: Jun. 16, 2023

(87) PCT Pub. No.: WO2022/136360

PCT Pub. Date: Jun. 30, 2022

(65) Prior Publication Data

US 2024/0300864 A1 Sep. 12, 2024

(30) Foreign Application Priority Data

Dec. 21, 2020 (EP) .................................... 20216183

(51) Int. Cl.
*C05C 9/00* (2006.01)
*C05G 3/90* (2020.01)

(52) U.S. Cl.
CPC . *C05C 9/00* (2013.01); *C05G 3/90* (2020.02)

(58) Field of Classification Search
CPC .. C05C 9/00; C05C 9/005; C05G 3/90; Y02P 60/21
See application file for complete search history.

(56) References Cited

U.S. PATENT DOCUMENTS 4,530,714 A 7/1985 Kolc
4,994,100 A 2/1991 Sutton et al.
(Continued)

FOREIGN PATENT DOCUMENTS

CN 102503687 6/2012
CN 211170514 U * 8/2020
(Continued)

OTHER PUBLICATIONS

Koch Agronomic Services, LLC, "Agrotain Ultra Booklet", 5 pages, 2018.

(Continued)

*Primary Examiner* — Jennifer A Smith
(74) *Attorney, Agent, or Firm* — DILWORTH IP, LLC

(57) ABSTRACT

A method for the manufacture of a homogeneous, solid, particulate, urea-based composition including urea and an additive in a urea production plant with at least an evaporator section and a particulation section, and one or more of a mixing section, an effluent gas treatment section and a scrubber solution storage section. The method includes steps of—:

(i) concentrating a urea melt of about 80 weight % to about 95 to 99 weight % of urea-;
(ii) particulating a urea or urea-based melt into a urea or urea-based composition;
(iii) mixing the urea melt of about 95 to 99 weight % with other fertilizer components to produce a urea-based melt;

(Continued)

1. Aqueous suspension
2. Aqueous solution (iv) treating the effluent gas from the particulation section including urea-based dust particles and ammonia gas with water to produce a scrubber solution; and
(v) storing the scrubber solution from the effluent gas treatment section.

24 Claims, 1 Drawing Sheet

(56) References Cited

U.S. PATENT DOCUMENTS

| | | | | |
|---|---|---|---|---|
| 5,352,265 | A | 10/1994 | Weston | |
| 2015/0052960 | A1 | 2/2015 | Makin | |
| 2017/0247297 | A9* | 8/2017 | Gabrielson | C09K 15/26 |
| 2019/0256432 | A1* | 8/2019 | Kuttenkuler | C05D 9/02 |

FOREIGN PATENT DOCUMENTS

| | | | |
|---|---|---|---|
| EP | 1670735 | A0 | 6/2006 |
| EP | 1761484 | | 3/2007 |
| EP | 3626697 | A1 | 3/2020 |
| GB | 1113735 | A | 5/1968 |
| WO | 2005040069 | A1 | 5/2005 |
| WO | 2006004412 | A1 | 1/2006 |
| WO | 2014028759 | | 2/2014 |
| WO | 2015027244 | | 2/2015 |
| WO | 2016137815 | A1 | 9/2016 |
| WO | 2017042194 | | 3/2017 |
| WO | 2017081183 | A1 | 5/2017 |
| WO | 2017168288 | | 10/2017 |
| WO | 2018069486 | A1 | 4/2018 |
| WO | 2018162533 | A1 | 9/2018 |
| WO | 2019215123 | | 11/2019 |
| WO | 2019215271 | | 11/2019 |
| WO | 2019215325 | | 11/2019 |

OTHER PUBLICATIONS

BASF, "Safety data sheet of Limus" Version 3.0, revised Jul. 30, 2021, 15 pages.
International Search Report and Written Opinion issued in App. No. PCT/EP2021/086967, mailing date Jun. 21, 2022, 13 pages.
EFMA, "Guidance for the compatibility of fertilizer blending materials", Jun. 2006, 16 pages.
Extended European Search Report and Search Opinion received for European Application No. 20216182.4, mailed on Jul. 22, 2021, 6 pages.
International Preliminary Report on Patentability received for PCT Patent Application No. PCT/EP2021/086943, mailed on Feb. 22, 2023, 4 pages.
International Search Report and Written Opinion received for PCT Patent Application No. PCT/EP2021/086943, mailed on Nov. 8, 2022, 09 pages.
Office Action received for European Application No. 21839225.6, mailed on Aug. 30, 2024, 8 pages.

* cited by examiner

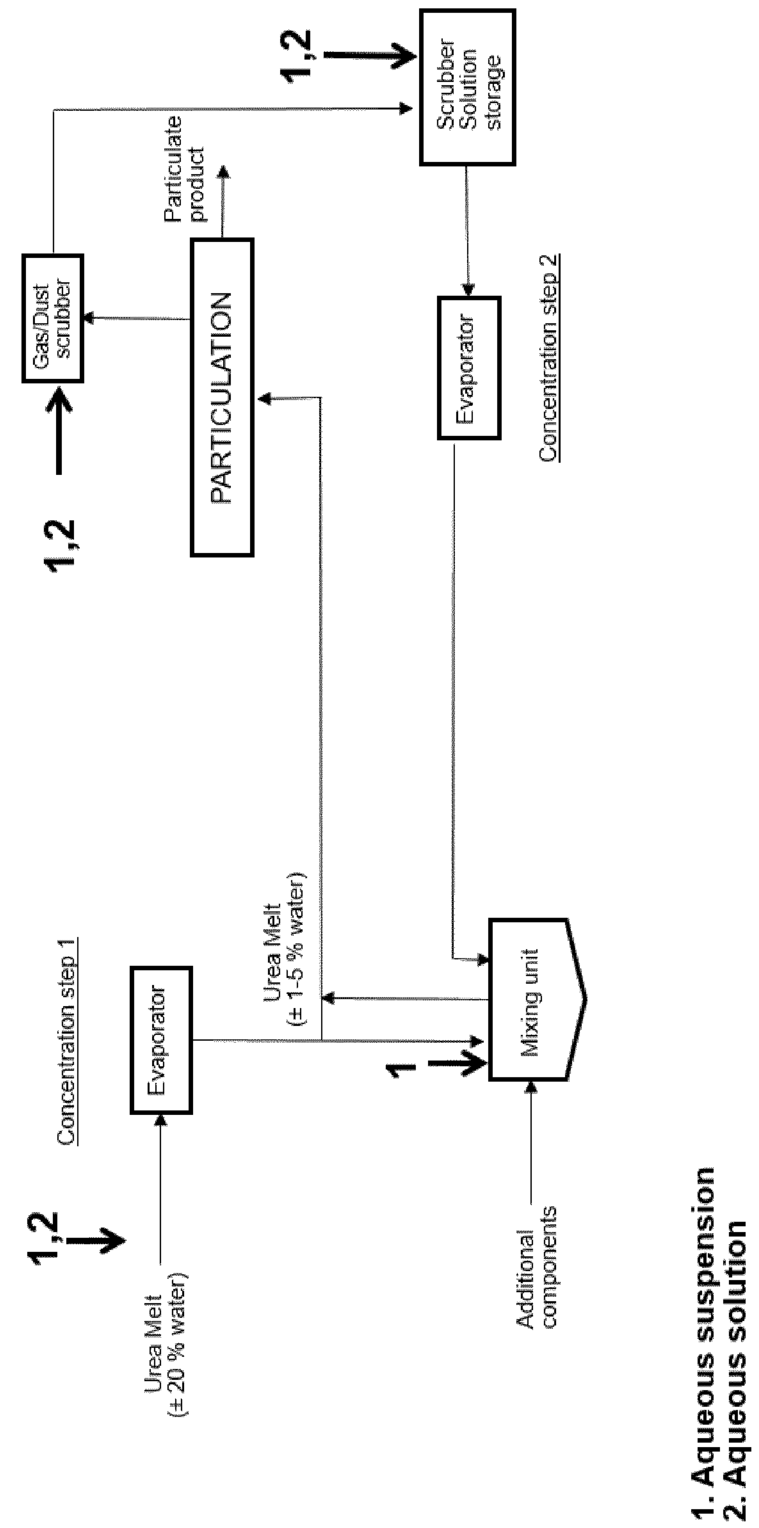
Scrubber
Solution
storage
1,2
Particulate
product
Gas/Dust
scrubber
PARTICULATION
1,2
Evaporator
Concentration step 2
Urea Melt
(± 1-5 % water)
Concentration step 1
Evaporator
Mixing unit
1
1,2
Urea Melt
(± 20 % water)
Additional
components
1. Aqueous suspension
2. Aqueous solution

METHOD FOR THE MANUFACTURE OF A UREA-BASED COMPOSITION COMPRISING THE ADDITION OF AN ADDITIVE IN AN AQUEOUS FORM

FIELD OF THE INVENTION

This invention relates to a method for the manufacture of a homogeneous, solid, particulate, urea-based composition comprising urea and an additive, in particular a urease inhibitor of the type phosphoric triamide for reducing ammonia loss by urease activity in the soil and volatilization of the resulting ammonia, a nitrification inhibitor for reducing the loss of nitrogen through leaching and denitrification, and stabilizers that may improve the chemical stability of either inhibitor.

BACKGROUND OF THE INVENTION

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is a basic element for any living system as a constituent of protein.

Urea is often used as such, but also as a component of a particulate blend, i.e., a physical blend (compound fertilizer) or melt blend (complex fertilizer), containing additional (primary and secondary nutrient) elements, such as potassium, phosphor, nitrogen and sulphur to obtain a particulate NPK(S), NP(S) or NK(S) blend, and other elements such as magnesium and calcium (secondary nutrients). In that respect, urea can easily be blended with, for example, potassium sulphate (sulphate of potash, SOP) and potassium magnesium sulphate (sulphate of potash magnesia). Urea can also be blended with sodium nitrate (Chilean nitrate 16-0-0), ammonium sulphate (sulphate of ammonia), urea ammonium sulphate (UAS), mono ammonium phosphate (MAP), di-ammonium phosphate (DAP), rock phosphate, potassium chloride (muriate of potash, MOP) and urea calcium nitrate (UCAN).

Particulate urea can hardly be mixed and stored as a blend with certain chemicals due to hygroscopic double salt formation or release of crystal water but can be mixed, and co-applied shortly after, with calcium nitrate, ammonium nitrate, calcium ammonium nitrate or limestone ammonium nitrate, ammonium sulphate nitrate, potassium ammonium nitrate (nitropotash), superphosphate, and triple superphosphate. A more detailed list can be found in "Guidance for the compatibility of fertilizer blending materials" by EFMA, Brussels, Belgium, June 2006.

Furthermore, urea particles can be "doped" or coated with elemental sulphur to supply sulphur, or indirectly sulphates, to the soil, preferably in sulphur-deficient soils.

Unfortunately, urea nitrogen cannot be assimilated directly by the plants and needs to be converted through hydrolysis into ammonium and nitrification into nitrate. Urea is first hydrolysed in the soil under the action of an enzyme, commonly called urease, to produce ammonia and carbon dioxide. Ureases are found in numerous bacteria, fungi, algae, plants and some invertebrates, as well as in soils, as a soil enzyme. Urea hydrolysis tends to increase the pH of its environment as the ammonia is dissolved into the water in the soil, and part of the ammonia can also be released into the atmosphere, a process called ammonia volatilization, thus becoming unavailable for the plant. About 50 weight % of nitrogen can sometimes be lost as a result of the volatilization of ammonia, all depending on the soil type, water content, pH, climate conditions, etc.

The availability of nitrogen, originating from urea, to the root system of plants can be improved by combining a urea-containing fertilizer (i.e., by incorporation or addition) with a urease inhibitor and/or a nitrification inhibitor. Urease inhibitors are compounds that are capable of temporarily reducing the activity of the enzyme and slow down the rate at which urea is hydrolysed, avoiding peaks of ammonia concentration and therefore limiting the losses to the air. Nitrification inhibitors are compounds that are capable of temporarily reducing the rate at which ammonium is converted into nitrate, thus reducing nitrogen loss through denitrification and leaching, by depressing the activity of *Nitrosomas* bacteria.

There are a limited number of compounds recognized commercially as nitrification inhibitors. Examples of nitrification inhibitors include, but are not limited to, dicyandiamide (DCD), 2-chloro-6-trichloromethylpyridine (nitrapyrin), dimethylpyrazole (DMP)-based compounds, such as 3,4-dimethylpyrazole phosphate (DMPP), 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxylate; ethylene urea; hydroquinone; phenylacetylene; phenylphosphorodiamidate; neemcake; calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, and chloroaniline.

There are many compounds that can inhibit urease, but only a few that are non-toxic, effective at low concentrations, chemically stable enough and able to be combined with urea-containing fertilizers. Among the most effective urease inhibitors known today are the phosphoric triamide compounds, first disclosed in U.S. Pat. No. 4,530,714 (Allied Corporation, 1985). An example of an effective urease inhibitor, disclosed in said patent, is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides. When combined with a urea-containing fertilizer, phosphoric triamide compounds reduce the rate at which urea is hydrolysed to ammonia in the soil. The benefits that are realized as a result of the delayed urea hydrolysis include the following: (1) nutrient nitrogen is available to the plant over a longer period of time, (2) excessive build-up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While phosphoric triamide compounds do not directly influence the rate of ammonium nitrification, they do control the levels of ammonium which are subject to the nitrification process and thereby indirectly controls the levels of nitrate nitrogen in the soil.

Hitherto, the urea inhibitor of the type phosphoric triamide, in particular nBTPT, is added to urea granules as a coating. This can be done in the urea production plant, after storage and/or just before shipment, or before the distribution of the urea on the field, using commercially available post-processing equipment, such as a drum coater. The urea inhibitor of the type phosphoric triamide is most frequently added to the urea granules as an organic solution, i.e. a composition wherein the urease inhibitor is dissolved in an organic, i.e., non-aqueous solvent. In embodiments where the urease inhibitor is used in this way, it is preferably used as a 0.1 to 75 weight % solution, preferably as a 15 to 30 weight % solution. Commercial solutions are available, for example as Agrotain® Ultra (Koch, US), N Yield™ (Eco Agro, US), Rhodia Ag-Rho™ N Protect B (Solvay, Germany), Iper N-Protect Liquid (Van Iperen, The Netherlands), and BASF Limus (BASF, Germany). A lot of research has been devoted to the manufacture of such organic solutions and their stability.

In recent years, research has also been devoted to stabilizers, improving the chemical stability of urease inhibitors in the presence of urea-based compounds, in particular the stability of N-(n-butyl) thiophosphoric triamide. Claimed stabilizers are alkaline-forming or alkaline inorganic compounds, such as metal oxides, carbonates, hydroxides and acetates, in particular calcium oxide, sodium hydroxide, sodium hydrogen carbonate, sodium carbonate, borax, zinc oxide, magnesium oxide, calcium carbonate, and any mixture thereof (WO2017/081183, WO2017/042194, WO2018/069486, WO2018/162533, all by Yara International ASA), cation-containing compounds wherein the cation is $Ca^{2+}$, $Mg^{2+}$, $Li^{+}$, $Fe^{2+}$, $Fe^{3+}$, $Al^{3+}$, $Ag^{+}$, $Cu^{2+}$, $Zn^{2+}$, $Hg^{2+}$, $Pb^{2+}$, $Ba^{2+}$, or a quaternary ammonium group comprising at least three groups selected from $C_{1-2}$-alkyl, and $C_{1-2}$-hydroxyalkyl (WO2017/168288, BASF SE), and magnesium sulphate/magnesium oxide mixtures (WO2019/215325, WO2019/215271, WO2019/215123, all by Yara International ASA).

The aforementioned inhibitors and stabilizers are usually added to the produced urea-based fertilizer granule as a coating, for example using a rotating drum. When added in solid particulate form to the produced urea-based fertilizer granules, this poses a dust problem. When added in liquid form to the produced urea-based fertilizer granules (which are hygroscopic), this poses the problem of having to use non-aqueous solvent systems in order not to dissolve the urea granules before use, but which solvent systems are foreign to an agricultural produce. Very little has been published on the direct addition of said additives, in particular a urea inhibitor of the type phosphoric triamide, a nitrification inhibitor, and stabilizers thereof, to a urea melt. This is very surprising since important benefits can be realized, and a number of problems can be resolved. For example, the urea inhibitor of the type phosphoric triamide, nBTPT, has a significant odour and when used as a solid additive applied to fertilize granules, gives off a significant smell. The use of non-aqueous solvent systems introduces chemical compounds to the fertilizer that are alien to the soil or to the production system of urea. Furthermore, non-aqueous solvent costs are higher than aqueous solvent costs. Furthermore, applying a toxic additive such as the urea inhibitor nBTPT on the surface of particles produces toxic dust coming off during handling of the particles, which in turn requires protective and safety measures for human operators and fertilizer handlers.

The inventors have now found a method for the manufacture of a homogeneous, solid, particulate, urea-based composition comprising urea and an additive, comprising a step where the additive is introduced into the urea in an aqueous form, i.e. as an aqueous suspension of particulate solid material, as an aqueous liquid of said additive, or as an aqueous dispersion of said additive. Surprisingly, the further addition of water has no significant effect on the quality of the urea or the urea-forming process, such that the method according to the invention can be implemented in any standard urea plant.

PRIOR ART

U.S. Pat. No. 5,352,265 (Weston et al., 1994) discloses a process for the incorporation of NBTPT and dicyandiamide (DCD) into a homogeneous fertilizer composition by blending a concentrated solution of NBTPT in a solvent, selected from the group consisting of liquid amides, 2-pyrrolidone, and N-alkyl-2-pyrrolidones directly into the molten urea prior to its granulation; the DCD may be added to the urea melt as a solid or in dissolved form along with the NBTPT.

CN 102503687 (Stanley Chemical Fertilizer Stock Co., 2012) discloses a method for producing a melt-granulated fertilizer, where a urease inhibitor, a nitrification inhibitor, a polypeptide synergist and a urea melt are mixed and melted at low temperature and together with MAP, potassium chloride and talcum powder are mixed into a urea melt and granulated.

WO 2014/028759 (Koch Agronomic Services, LLC, 2014) discloses a urea granules composition comprising urea formaldehyde polymer (UFP) particles coated with nBTPT. Said coated UF particles can be mixed with the urea granules as a coating or can be mixed into the urea melt before granulation, either dry or as a concentrated solution of nBTPT/substantially spherical UFP.

WO 2015/027244 (Koch Agronomic Services, LLC, 2015) discloses a method for producing a solid urea-nitrogen stabilizer composition, wherein the nitrogen stabilizer composition is selected from the group of a urease inhibitor composition and a nitrification inhibitor composition, comprising the step of adding said composition to molten urea with a water content of less than 0.2 weight % and wherein the time between the cooling of the molten urea-nitrogen stabilizer composition is less than 20 seconds. The solvent systems disclosed are all organic solvent-based, such as NMP.

WO 2016/137815 (Koch Agronomic Services, LLC, 2016) discloses a urea-nitrogen stabilizer fertilizer composition having a nitrogen stabilizer and carrier system substantially homogeneously dispersed throughout the granule thickness using the method of WO 2015/027244. The carrier system can comprise any solvent system that is both: (I) stable at urea melt temperatures of about 120 C; (2) able to solvate the nitrogen stabilizer; and (3) miscible in molten urea. Such carrier systems can be blends of NMP and a glycol (e.g., propylene glycol), but not water.

WO 2017/081183 A1 (Yara, 2017) and WO 2018/162533 (Yara, 2018) disclose a method for the manufacture of a solid, particulate, urea-based blend composition wherein nBTPT was stabilized using a stabilizer and added to a urea melt and subsequently, the mixture was granulated in a fluidized bed granulator. Solid nBTPT was added to a urea melt, which was subsequently granulated in a fluidized bed granulator.

EP3626697A1 (Tessenderlo Kerley, 2020) discloses a method for the manufacture of a urea-based fertilizer, wherein additives, such as urease inhibitors and/or nitrification inhibitors, are added to a urea melt.

GB1113735A (Inventa, 1968) discloses a method, wherein aqueous solutions of different chemicals are added to a urea melt, and the melt is subsequently prilled.

There is a need to add a precise dose of an additive, in particular a urease inhibitor, a nitrification inhibitor, or a stabilizer for these inhibitors, to a urea-based composition when produced in a typical urea production plant wherein urea or urea-based compounds are produced. Usually, this is done as a coating on the granules, and using organic solvents as solvent or suspension systems. This poses several problems, as discussed above.

STATEMENT AND SUMMARY OF THE INVENTION

The inventors have now addressed the abovementioned problems, and found that an additive, such as one selected from the group of a urease inhibitor of the type phosphoric triamide, a nitrification inhibitor, and an alkaline-forming or alkaline inorganic compound, can be added to a urea melt in a precise dose using different addition points in the process for the production of urea or urea-based compounds, wherein the additive is introduced into the urea or urea-based composition as an aqueous suspension of particulate solid material, as an aqueous liquid of said additive, or as an aqueous dispersion of said additive.

The use of water as a suspension, solvent or dispersion medium, and the addition of water to a urea melt that already contains water, does not impact the quality of such urea. Moreover, the process for the production of urea or urea-based composition already contains process steps and measures to remove water from a urea or urea-based melt, thus effectively removing the solvent, suspension or dispersion medium (i.e. water). Hence, no alien substances other than the intended additives remain in the final urea product.

Therefore, according to a first aspect, the invention relates to a method for the manufacture of a homogeneous, solid, particulate, urea-based composition comprising urea and one or more additives in a urea production plant comprising at least an evaporator section and a particulation section, further comprises one or more of a mixing section, an effluent gas treatment section and a scrubber solution storage section, wherein the method comprises at least the steps of:

(i) in the evaporator section, concentrating a urea melt of about 80 weight %, to about 95 to 99 weight % of urea;
(ii) in the particulation section, particulating a urea or urea-based melt into a urea or urea-based composition;

and further comprises one or more of the steps of:

(iii) in the mixing section, if present, mixing the urea melt of about 95 to 99 weight % with other fertilizer components to produce a urea-based melt;
(iv) in the effluent gas treatment section, if present, treating the effluent gas from the particulation section comprising urea-based dust particles and ammonia gas with water to produce a scrubber solution; and
(v) in the scrubber solution storage section, if present, storing the scrubber solution from the effluent gas treatment section;

wherein the additive is introduced into the urea or urea-based composition as an aqueous suspension, an aqueous dispersion, or an aqueous liquid, by adding the additive to one or more of:

(a) said effluent gas treatment section, if present;
(b) said scrubber solution storage section containing the scrubber solution, if present;
(c) said urea melt, such as said urea melt of about 80 weight %, upstream of the evaporation section;
(d) said urea-based melt in the mixing section, if present.

In a related aspect, the present disclosure provides a method for the manufacture of a homogeneous, solid, particulate, urea-based composition comprising urea and an additive, in a urea production plant comprising at least an evaporator section, a particulation section, and an effluent gas treatment section, and optionally a scrubber solution storage section and/or a mixing section, wherein the method comprises at least the steps of:

(i) in the evaporator section, concentrating a urea melt to 95 to 99 weight % of urea;
(ii) in the particulation section, particulating a urea or urea-based melt into an homogeneous, solid, particulate urea-based composition, thereby producing an effluent gas comprising urea-based dust particles and ammonia gas;
(iii) in the effluent gas treatment section, treating the effluent gas from the particulation section comprising urea-based dust particles and ammonia gas with an aqueous solution, such as water, to produce a scrubber solution;

and optionally comprises one or more of the steps of:

(iv) in the mixing section, if present, mixing the urea melt of 95 to 99 weight % with other fertilizer components to produce a urea-based melt; and
(v) in the scrubber solution storage section, if present, storing the scrubber solution from the effluent gas treatment section;

wherein the additive is introduced into the urea or urea-based composition as an aqueous suspension, an aqueous dispersion, or an aqueous liquid, by adding the additive to one or more of:

(a) said effluent gas treatment section; and/or
(b) said scrubber solution storage section containing the scrubber solution, if present.

FIGURES

FIG. 1 represents the workflow of an embodiment of the method according to the present disclosure.

DETAILED DESCRIPTION OF THE INVENTION

Within the context of this disclosure, the expression "weight percent", "% wt" or "weight %", here and throughout the description unless otherwise defined, refers to the relative weight of the respective component based on the overall weight of the formulation.

Within the context of this application, with a particulate form is meant a physical form that can also be designated as granulated, prilled, crystalline, compacted, powdered, and the like, wherein the respective compound is in a small unitary form.

Within the context of this application, a urea melt is a particular form of a urea-based melt, wherein the melt does not contain any major components, other than urea.

A urea-based melt is a urea melt which contains another major matrix component, such as ammonium sulphate.

Within the context of this application, with stabilizer is meant a compound which is able to improve the chemical stability of either the urease inhibitor, the nitrification inhibitor, or both.

Within the context of this application, with aqueous suspension is meant any composition wherein the additive is at least suspended as a particulate solid in water. Examples are nBTPT in water, calcium oxide in water or magnesium sulphate in water. The suspension may contain suspension stabilizers, wetting agents, surface-active compounds and the like.

Within the context of this application, with aqueous dispersion is meant any composition wherein the additive is an at least partly water-immiscible liquid that is intimately mixed with water, wherein either the water or the at least partly water-immiscible liquid is the continuous phase.

Within the context of this application, with aqueous liquid is meant a liquid that comprises from 80 to 100 weight % of water and which may contain up to 20 weight % of further solvents which are miscible with water at room temperature, such as methyl alcohol, ethyl alcohol and the like.

In one aspect, the invention is concerned with a method for the manufacture of a homogeneous, solid, particulate, urea-based composition comprising urea and one or more additives in a urea production plant comprising at least an evaporator section and a particulation section, wherein the method comprises at least the steps of:

(i) in the evaporator section, concentrating a urea melt of about 80 weight % to about 95 to 99 weight % of urea;

(ii) in the particulation section, particulating a urea or urea-based melt into a urea or urea-based composition;

wherein the additive is introduced into the urea as an aqueous suspension, an aqueous dispersion, or an aqueous liquid, by adding the additive to:

(c) said urea melt of about 80 weight % upstream of the evaporation section.

This means that in the above embodiment where the urea plant only comprises an evaporation section (which is always required to remove the water from the urea melt such that a urea melt of 80 weight of urea is concentrated into a urea melt of 95 weight %, or even 99 weight % using one or more evaporation units) and a particulation section (which is always required to convert the liquid urea melt into solid urea particles), the additive is introduced into said urea melt of about 80 weight % upstream of the evaporation section.

According to one embodiment of the present invention, according to option c), the additive is added as an aqueous liquid or aqueous suspension to said urea melt of about 80 weight % upstream of the evaporation section. Using option c), the water is removed by the evaporation section shortly after its addition thereof to the urea.

According to another embodiment, the urea production plant comprising at least an evaporator section and a particulation section, further comprises one or more of a mixing section, an effluent gas treatment section and a scrubber solution storage section; wherein the method comprises at least the steps of:

(i) in the evaporator section, concentrating a urea melt of about 80 weight % to about 95 to 99 weight % of urea;

(ii) in the particulation section, particulating a urea or urea-based melt into a urea or urea-based composition;

and further comprises one or more of the steps of:

(iii) in the mixing section, if present, mixing the urea melt of about 95 to 99 weight % with other fertilizer components to produce a urea-based melt;

(iv) in the effluent gas treatment section, if present, treating the effluent gas from the particulation section comprising urea-based dust particles and ammonia gas with water to produce a scrubber solution; and (v) in the scrubber solution storage section, if present, storing the scrubber solution from the effluent gas treatment section;

wherein the additive is introduced into the urea or urea-based composition as an aqueous suspension, an aqueous dispersion, or an aqueous liquid, by adding the additive to one or more of:

(a) said effluent gas treatment section, if present;

(b) said scrubber solution storage section containing the scrubber solution, if present;

(c) said urea melt of about 80 weight % upstream of the evaporation section;

(d) said urea-based melt in the mixing section, if present.

This means that in the embodiment where the urea plant as disclosed above also comprises one or more of a mixing section, an effluent gas treatment section and a scrubber solution storage section, the additive may be introduced into the urea as an aqueous suspension, an aqueous dispersion, or an aqueous liquid, by adding the additive to one or more of the following four alternatives:

(a) said effluent gas treatment section;

(b) said scrubber solution storage section containing the scrubber solution;

(c) said urea melt of about 80 weight % upstream of the evaporation section;

(d) said urea-based melt in the mixing section.

The above features (i), (ii), (iii), (iv) and (v) are common for a standard urea production plant using a fluidized bed granulator, as is outlined in FIG. 1.

In the evaporator section, a urea melt with a water content above 5 weight %, such as from 40 to 85 weight %, from 50 to 85 weight %, from 60 to 85 weight %, or from 70 to 85 weight % is concentrated to a urea melt comprising from 95 to 99 weight % of urea. The evaporator section produces a urea melt comprising from 0.1 to 5 weight %, from 0.5 to 5 weight %, or from 1 to 5 weight % of water.

In principle, the additive is suitably introduced into the urea or urea-based composition as an aqueous suspension, an aqueous dispersion, or an aqueous liquid. However, depending on the specific equipment, one or more of the above may be preferred.

According to one embodiment of the present invention, according to option c), the additive is added as an aqueous liquid or aqueous suspension.

According to one embodiment of the present invention, according to option d), the additive is added as an aqueous suspension, in particular to said urea melt in the mixing section. The mixing section is an optimal location as the mixing section comprises addition and mixing means that are designed to mix in additives or other compounds into the urea melt. However, using option d), the additional water is not removed before the granulation step.

According to one embodiment of the present invention, according to option a), the additive is added as an aqueous suspension or aqueous solution to the effluent gas treatment section, in particular to the water that is used in the effluent gas treatment section for treating the effluent gas from the particulation section comprising urea dust particles and ammonia gas to produce a scrubber solution. Surprisingly, it was found very easy and efficient to add the additive as an aqueous suspension to the water supply used in the effluent gas treatment section. According to this option, the water supply acts as an entry point for the additive. The additive is subsequently transported within the scrubber solution to the evaporator section, to the particulation section or to the mixing section, optionally via a scrubber solution storage section.

According to one embodiment of the present invention, according to option b), the additive can also be added as an aqueous suspension or aqueous solution to a scrubber solution storage tank in the scrubber solution storage section containing the scrubber solution. The scrubber solution is subsequently transported to a scrubber evaporator, where the bulk of the water is removed. Thereafter, the resulting solution is added to the mixing section where it is mixed in with the highly concentrated urea melt, or is introduced in the particulation section.

According to an alternative embodiment of the present invention, according to option b), the additive can also be added as an aqueous suspension or aqueous solution to a small mixing tank, part of the scrubber solution storage section, where a portion of the scrubber solution is fed into from the main scrubber solution tank. The additive is subsequently added to said small mixing tank and directly fed to the particulation section. This setup would obviate the need to evaporate the solvent in the scrubber evaporator, and to expose the additives to unwanted higher temperatures and degradation thereof.

Adding the additive in the effluent gas treatment section and/or in the scrubber solution storage section has the advantage that the water content of the urea melt is not directly impacted by the addition of the additive. When the additive is added in the effluent gas treatment section and/or in the scrubber solution storage section, the addition of the scrubber solution back into the urea melt is the only dilution operation carried out, so it may be easier to regulate the final water content of the urea melt or the amount of evaporation required by the melt before the granulation.

The scrubber solution with the desired chemical composition, such as the desired additive concentration, may be directed to the production process, upstream, i.e. before, of the particulation stage. For example, the scrubber solution may be added to the melt before it enters the evaporator section of step (i), or may be added in the mixing section, if present, of step (iv). By doing so, the urea or urea-based melt particulated in step (ii) comprises the additive that was originally added in the effluent gas treatment section or the scrubber solution storage section.

According to one embodiment, each of the addition methods a), b), c), and d) can be combined to have multiple additions to the urea or urea-based product.

According to one embodiment of the present invention, the particulation section is selected from the group of fluidized bed granulator, pan granulator, drum granulator, prilling tower, spherodizer, and pastillizer. Each of these particulation sections starts from a melt as feed material and granulates said melt into a homogeneous, solid, particulate composition, either by action of accretion (fluidized bed) or agglomeration. The particulation section requires a stream of gas to cool down the solid, particulate composition produced therein. While cooling down the solid, particulate composition, it becomes contaminated with pollutants, such as urea dust or urea-based dust and ammonia gas. The stream of polluted gas is often treated in a gas effluent treatment section to remove some or all of the pollutants before the gas stream is released in the atmosphere.

The gas effluent treatment section may comprise a scrubber, in particular a wet scrubber. A wet scrubber comprises a section wherein the gas stream is passing through wetted screens that capture the pollutants. An aqueous solution, such as water, in the form of vapor or droplets, may be added to the gas stream to improve the capture rate of the pollutants by the screens.

According to a preferred embodiment of the present invention, the particulation section is a fluidized bed granulator.

In a related aspect, the present disclosure provides a method for the manufacture of a homogeneous, solid, particulate, urea-based composition comprising urea and an additive, in a urea production plant comprising at least an evaporator section, a particulation section, and an effluent gas treatment section and optionally a scrubber solution storage section, and/or a mixing section, wherein the method comprises at least the steps of:

(i) in the evaporator section, concentrating a urea melt to 95 to 99 weight % of urea;

(ii) in the particulation section, particulating a urea or urea-based melt into an homogeneous, solid, particulate urea-based composition, thereby producing an effluent gas comprising urea-based dust particles and ammonia gas;

(iii) in the effluent gas treatment section, treating the effluent gas from the particulation section comprising urea-based dust particles and ammonia gas with an aqueous solution, such as water, to produce a scrubber solution;

and optionally comprises one or more of the steps of:

(iv) in the mixing section, if present, mixing the urea melt of 95 to 99 weight % with other fertilizer components to produce a urea-based melt;

and (v) in the scrubber solution storage section, if present, storing the scrubber solution from the effluent gas treatment section;

wherein the additive is introduced into the urea or urea-based composition as an aqueous suspension, an aqueous dispersion, or an aqueous liquid, by adding the additive to one or more of:

(a) said effluent gas treatment section; and/or (b) said scrubber solution storage section containing the scrubber solution, if present.

This aspect may exhibit the same embodiments as described above.

In one embodiment, the urea production plant comprises an effluent gas treatment section. The effluent gas treatment section comprises one device, such as a scrubber, for treating the effluent gas from the particulation section comprising urea-based dust particles and ammonia gas with an aqueous solution, such as water, to produce a scrubber solution.

Furthermore, the evaporation section may receive a urea melt with a urea concentration not equal to 80 weight %. For example, the urea melt directed to the evaporation section may have a concentration of from 40 to 85 weight %, from 50 to 85 weight %, from 60 to 85 weight %, or from 70 to 85 weight %.

Additives

According to one embodiment of the present invention, the additive is one or more, selected from the group of a urease inhibitor of the type phosphoric triamide, a nitrification inhibitor, and an alkaline-forming or alkaline inorganic compound, a cation-containing compound, and magnesium sulphate/magnesium oxide mixtures. All these additives have been disclosed in the prior art.

According to one embodiment of the present invention, the urease inhibitor of the type phosphoric triamide is a compound of formula I:

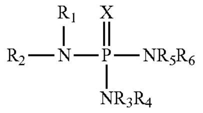

wherein:

X is oxygen or sulphur;

$R_1$ is alkyl, cycloalkenyl, aralkyl, aryl, alkenyl, alkynyl, or cycloalkyl;

$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and $R_3$, $R_4$, $R_5$ and $R_6$ are individually hydrogen or alkyl having 1 to 6 carbon atoms. In the present specification and claims, the term "phosphoric triamide compounds" is used to refer to the compounds of formula I.

The terms alkyl, cycloalkenyl, aralkyl, aryl, alkenyl, alkynyl, and cycloalkyl as used herein, refer to compounds having from up to 10 carbon atoms, preferably up to 6 carbon atoms. The lowest number of carbon atoms is between 1-3 depending on the structure of the substituent.

According to one embodiment of the present invention, the urease inhibitor is N-(n-butyl) thiophosphoric triamide (nBTPT). nBTPT is sold in the market, in different formulations and has the following chemical formula

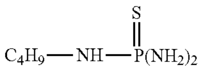

It should be understood that the term nBTPT, as used throughout this specification, refers not only to N-(n-butyl) thiophosphoric triamide in its pure form, but also to industrial grades of this compound which may contain up to 50 weight % impurities, depending on the method of synthesis and purification scheme(s), if any, employed in the production of the nBTPT.

In embodiments where the urease inhibitor is used in its particulate form, it is used as a powder, preferably with a purity of 97 weight % or more. It is available, for example, from Sunfit Chemical Co. (China). In embodiments where the urease inhibitor is used in its particulate form, it is preferably used as a 0.1 to 75 weight % dispersion, preferably as a 15 to 30 weight % dispersion.

In order to be effective, the urease inhibitor of the type phosphoric triamide, in particular N-(n-butyl) thiophosphoric triamide (nBTPT) is added to the urea-based composition at a level of 0.0001 to 1% weight %, preferably at a level of 0.02 to 0.2% weight %, most preferably at a level of 0.04 to 0.06 weight %, relative to the total weight of the urea-based composition.

According to one embodiment of the present invention, the nitrification inhibitor is selected from the group of dicyandiamide (DCD), 2-chloro-6-trichloromethylpyridine (nitrapyrin), dimethylpyrazole (DMP)-based compounds, such as 3,4-dimethylpyrazole phosphate (DMPP), 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxylate; ethylene urea; hydroquinone; phenylacetylene; phenylphosphoro diamidate; neemcake; calcium carbide; 5-ethoxy-3-trichloromethyl-1,2,4-thiadiazol (etridiazol; terraole); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, chloroaniline, and derivatives and salts thereof.

In order to be effective, the nitrification inhibitor is added to the urea-based composition at a level of 0.0001 to 1% weight %, preferably at a level of 0.02 to 0.2% weight %, most preferably 0.04 to 0.06 weight %, relative to the total weight of the urea-based composition.

According to one embodiment of the present invention, the alkaline-forming or alkaline inorganic compound is selected from the group of metal oxides, carbonates, hydroxides, acetates, and any mixture thereof. More in particular, the alkaline-forming or alkaline compound is selected from the group of calcium oxide, sodium hydroxide, sodium hydrogen carbonate, sodium carbonate, borax, zinc oxide, magnesium oxide, calcium carbonate, and any mixture thereof.

In order to be effective, the alkaline-forming or alkaline compound is added to the urea-based composition at a level of 0.02 to 1 weight %, preferably at a level of 0.05 to 1 weight %, relative to the total weight of the composition.

According to one embodiment of the present invention, the cation in the cation-containing compound is $Ca^{2+}$, $Mg^{2+}$, $Li^{+}$, $Fe^{2+}$, $Fe^{3+}$, $Al^{3+}$, $Ag^{+}$, $Cu^{2+}$, $Zn^{2+}$, $Hg^{2+}$, $Pb^{2+}$, $Ba^{2+}$, or a quaternary ammonium group comprising at least three groups selected from $C_{1-2}$-alkyl, and $C_{1-2}$-hydroxyalkyl. According to one embodiment of the present invention, the cation in the cation-containing compound is magnesium sulphate.

In order to be effective, the cation-containing compound is added to the urea-based composition at a level of 0.02 to 1 weight %, preferably at a level of 0.05 to 1 weight %, relative to the total weight of the composition.

According to one embodiment of the present invention, the additive is a mixture of magnesium sulphate and magnesium oxide. In order to be effective, the magnesium sulphate/magnesium oxide mixture is added to the urea-based composition at a level of 0.02 to 1 weight %, preferably at a level of 0.05 to 1 weight %, relative to the total weight of the composition.

According to one embodiment of the present invention, the solid, particulate, urea-based composition further comprises one or more compounds selected from the group of ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), urea potassium salts (UK), elemental sulphur, or mixtures thereof. Any of these compounds added to urea produces the urea-based fertilizer. These compounds are particularly added to the urea melt in the mixing section, mentioned in step (ii) or equivalent.

According to one embodiment of the present invention, the solid, particulate, urea-based composition may comprise from about 40 to 99 weight % of urea.

According to one embodiment of the present invention, the solid, particulate, urea-based composition is urea or urea ammonium sulphate (UAS).

Preferably, to serve as a fertilizer, the average particle size (dp50) of the solid, particulate, urea-based composition is between 0.5.0 mm and 5 cm, preferably between 1.0 mm and 1 cm, preferably between 1.0 mm and 6.0 mm, preferably between 2.0 mm and 4.0 mm, preferably between 3.0 mm and 5.0 mm, preferably between 2.5 mm and 3.6 mm, as determined by mesh sieve screening.

The solid, particulate, urea-based composition may contain elemental sulphur, may be coated with micronutrients or other nutrients, or may be treated in any other way. It may contain any other processing additive, such as granulation additive, typically a urea-formaldehyde condensate, etc.

EXAMPLE

The following example is included to demonstrate certain embodiments of the invention. It should be appreciated by the skilled person that the techniques disclosed in the examples represent techniques discovered by the inventors to function well in the practice of the invention. The skilled person should, however, in light of the present invention, appreciate that many changes can be made in the specific embodiments that are disclosed and still obtain a like or similar result without departing from the spirit and scope of the invention, therefore all matter set forth is to be interpreted as illustrative and not in a limiting sense.

Example 1: Production of Urea

A urea melt of about 80 weight % (containing about 20 weight % of water) and having a melt temperature of 110° C. is introduced into an evaporator, where the melt is concentrated up to 97 weight % of urea by evaporation of the water (concentration step 1). Prior to the introduction into the evaporator an aqueous suspension of 50 weight % of nBTPT in water is added to the melt, such that a final concentration of about 600 ppm in the urea melt is obtained. The concentrated melt is subsequently mixed with an amount of ammonium sulphate at 110° C. in a mixing section and subsequently fed to a standard fluidized bed granulator to obtain a UAS composition of 23 weight % of AS, or 30 weight % of AS. The effluent gas containing urea ammonium sulphate dust and ammonia gas is treated in an effluent gas treatment section, where they are captured into a scrubber solution. Said scrubber solution is fed to a scrubber solution storage section, comprising a scrubber solution storage container (which works as a buffer) and subsequently pumped to a scrubber evaporator (concentration step 2) where the water content is reduced to about 3 weight %. The concentrated scrubber solution is subsequently added to the mixing section where it is mixed with the concentrated urea ammonium sulphate. The resulting granulated urea ammonium sulphate product contained about 550 ppm of nBTPT, and little degradation was observed.

Alternatively, the aqueous suspension of 50 weight % of nBTPT in water was added to the mixing section, the water used in the effluent gas treatment section, and added to the scrubber solution storage section. The resulting granulated urea ammonium sulphate product contained about 550 ppm of nBTPT, and little degradation was observed.

The invention claimed is:

1. A method for the manufacture of a homogeneous, solid, particulate, urea-based composition comprising urea and an additive, in a urea production plant comprising at least an evaporator section, and a particulation section, further comprising at least one of a mixing section, an effluent gas treatment section, and a scrubber solution storage section, wherein the method comprises at least the steps of:

(i) concentrating, in the evaporator section, a urea melt to 95 to 99 weight % of urea;

(ii) particulating, in the particulation section, the urea or the urea melt into a homogeneous, solid, particulate, urea-based composition, thereby producing an effluent gas comprising urea-based dust particles and ammonia gas;

(iii) treating in the effluent gas treatment section, the effluent gas from the particulation section comprising the urea-based dust particles and the ammonia gas with an aqueous solution to produce a scrubber solution; and comprises steps of:

(iv) mixing, in the mixing section the urea melt of 95 to 99 weight % with other fertilizer components to produce the urea melt;

and (v) storing, in the scrubber solution storage section the scrubber solution from the effluent gas treatment section;

wherein the additive is introduced into the urea melt or the homogeneous, solid, particulate, urea-based composition as an aqueous suspension, an aqueous dispersion, or an aqueous liquid, by adding the additive to at least one of:

(a) said effluent gas treatment section; or (b) said scrubber solution storage section containing the scrubber solution.

2. The method according to claim 1, wherein, the additive is added to the aqueous solution that is used in the effluent gas treatment section for treating the effluent gas from the particulation section comprising the urea-based dust particles and the ammonia gas to produce a scrubber solution.

3. The method according to claim 2, further comprising introducing the scrubber solution, including the additive, from the effluent gas treatment section to the evaporator section, the mixing section, or the particulation section.

4. The method according to claim 1, wherein the additive is added to said scrubber solution storage section containing the scrubber solution.

5. The method according to claim 4, further comprising introducing the scrubber solution, including the additive, from the scrubber solution storage section to the evaporator section, the mixing section, or the particulation section.

6. The method according to claim 1, wherein the particulation section is selected from the group consisting of fluidized bed granulator, pan granulator, drum granulator, prilling tower, spherodizer, and pastillizer.

7. The method according to claim 1, wherein the additive is at least one of a phosphoric triamide urease inhibitor, a nitrification inhibitor, an alkaline-forming or alkaline inorganic compound, a cation-containing compound, and magnesium sulphate/magnesium oxide mixtures.

8. The method according to claim 7, wherein the phosphoric triamide urease inhibitor is a compound of formula:

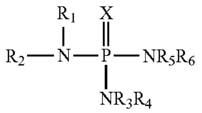

wherein:

X is oxygen or sulphur;

$R_1$ is alkyl, cycloalkenyl, aralkyl, aryl, alkenyl, alkynyl, or cycloalkyl;

$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and $R_3$, $R_4$, $R_5$ and $R_6$ are individually hydrogen or alkyl having 1 to 6 carbon atoms.

9. The method according to claim 8, wherein the urease inhibitor is added to the urea-based composition at a level of 0.0001 to 1% weight %, relative to the total weight of the urea-based composition.

10. The method according to claim 9 wherein the urease inhibitor is added to the urea-based composition at a level of 0.02 to 0.2 weight %.

11. The method according to claim 7, wherein the nitrification inhibitor is selected from the group consisting of dicyandiamide (DCD); 2-chloro-6-trichloromethylpyridine (nitrapyrin); 3,4-dimethylpyrazole phosphate (DMPP); other dimethylpyrazole (DMP)-based compounds; 3-methylpyrazole (MP); 1-H-1,2,4-triazole (TZ); 3-methylpyrazole-1-carboxamide (CMP); 4-amino-1,2,4-triazole (AT, ATC); 3-amino-1,2,4-triazole; 2-cyanimino-4-hydroxy-6-methylpyrimidine (CP); 2-ethylpyridine; ammonium thiosulfate (ATS); sodium thiosulfate (ST); thiophosphoryl triamide; thiourea (TU); guanylthiourea (GTU); ammonium polycarboxylate; ethylene urea; hydroquinone; phenylacetylene; phenylphosphoro diamidate; neem_cake; calcium carbide; 5-ethoxy-3-trichloromethyl-1,2,4-thiadiazole (etridiazol); 2-amino-4-chloro-6-methylpyrimidine (AM); 1-mercapto-1,2,4-triazole (MT); 2-mercaptobenzothiazole (MBT); 2-sulfanilamidothiazole (ST); 5-amino-1,2,4-thiadiazole; 2,4-diamino-6-trichloromethyl-s-triazine (CL-1580); N-2,5-dichlorophenyl succinanilic acid (DCS); nitroaniline, chloroaniline, and salts thereof.

12. The method according to claim 11, wherein the nitrification inhibitor is present in the urea-based composition at a level of 0.0001 to 1 weight %, relative to the total weight of the urea-based composition.

13. The method according to claim 12 wherein the nitrification inhibitor is present in the urea-based composition at a level of 0.02 to 0.2 weight %.

14. The method according to claim 7, wherein the alkaline-forming or alkaline inorganic compound is selected from the group consisting of metal oxides, carbonates, hydroxides, acetates, and any mixture thereof.

15. The method according to claim 14 wherein the alkaline-forming or alkaline compound is selected from the group of calcium oxide, sodium hydroxide, sodium hydrogen carbonate, sodium carbonate, borax, zinc oxide, magnesium oxide, calcium carbonate, and any mixture thereof.

16. The method according to claim 14, wherein the alkaline-forming or alkaline inorganic compound is added to the urea-based composition at a level of 0.02 to 1 weight %, relative to the total weight of the composition.

17. The method according to claim 16 wherein the alkaline forming or alkaline inorganic compound is added to the urea-based composition at a level of 0.05 to 1 weight %.

18. The method according to claim 7, wherein the cation in the cation-containing compound is $Ca^{2+}$, $Mg^{2+}$, Lit, $Fe^{2+}$, $Fe^{3+}$, $Al^{3+}$, $Ag^{+}$, $Cu^{2+}$, $Zn^{2+}$, $Hg^{2+}$, $Pb^{2+}$, $Ba^{2+}$, or a quaternary ammonium group comprising at least three groups selected from $C_{1-2}$-alkyl, and $C_{1-2}$-hydroxyalkyl.

19. The method according to claim 18, wherein the cation-containing compound is added to the urea-based composition at a level of 0.02 to 1 weight %, relative to a total weight of the composition.

20. The method according to claim 19 wherein the cation-containing compound is added to the urea-based composition at a level of 0.05 to 1 weight %.

21. The method according to claim 7, wherein the magnesium sulphate/magnesium oxide mixture is added to the urea-based composition at a level of 0.02 to 1 weight %, relative to a total weight of the composition.

22. The method according to claim 21 wherein the magnesium sulphate/magnesium oxide mixture is added to the urea-based composition at a level of 0.05 to 1 weight %.

23. The method according to claim 1, wherein the solid, particulate, urea-based composition further comprises one or more compounds selected from the group of ammonium nitrate, calcium nitrate, calcium ammonium nitrate, sodium nitrate, ammonium sulphate nitrate, potassium ammonium nitrate, mono-ammonium phosphate (MAP), di-ammonium phosphate (DAP), other ammonium phosphates, calcium bis(dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), urea potassium salts (UK), elemental sulphur, or mixtures thereof.

24. The method according to claim 23, wherein the solid, particulate, urea-based composition comprises from about 40 to 99 weight % of urea.

* * * * *